H. SIEGMANN.
APPARATUS FOR WELDING TIRE AND LIKE JOINTS.
APPLICATION FILED JAN. 17, 1910.

1,000,350.

Patented Aug. 8, 1911.

UNITED STATES PATENT OFFICE.

HEINRICH SIEGMANN, OF GROSSENWIEDEN-ON-THE-WESER, GERMANY.

APPARATUS FOR WELDING TIRE AND LIKE JOINTS.

1,000,350. Specification of Letters Patent. Patented Aug. 8, 1911.

Application filed January 17, 1910. Serial No. 538,478.

*To all whom it may concern:*

Be it known that I, HEINRICH SIEGMANN, a subject of the German Emperor, residing at Grossenwieden-on-the-Weser, Schaumburg, in Germany, have invented a certain new and useful Improvement in Apparatus for Welding Tire and Like Joints, of which the following is a specification.

The object of this invention is to provide improved means for welding the joints of metal tires and other rings formed by bending bands of metal.

The invention substantially consists in using two flexible devices, for example chains, laid respectively around opposite portions of the circumference of the ring, while that portion of the bent band meet, rests between ends of the bent band meet, rests between two abutments placed respectively within and without the ring, the arrangement of the flexible members being such that by pulling them the ends of the band, previously raised to welding heat, are squeezed together and welded.

The invention is illustrated in the annexed drawings, in which—

Figure 1:
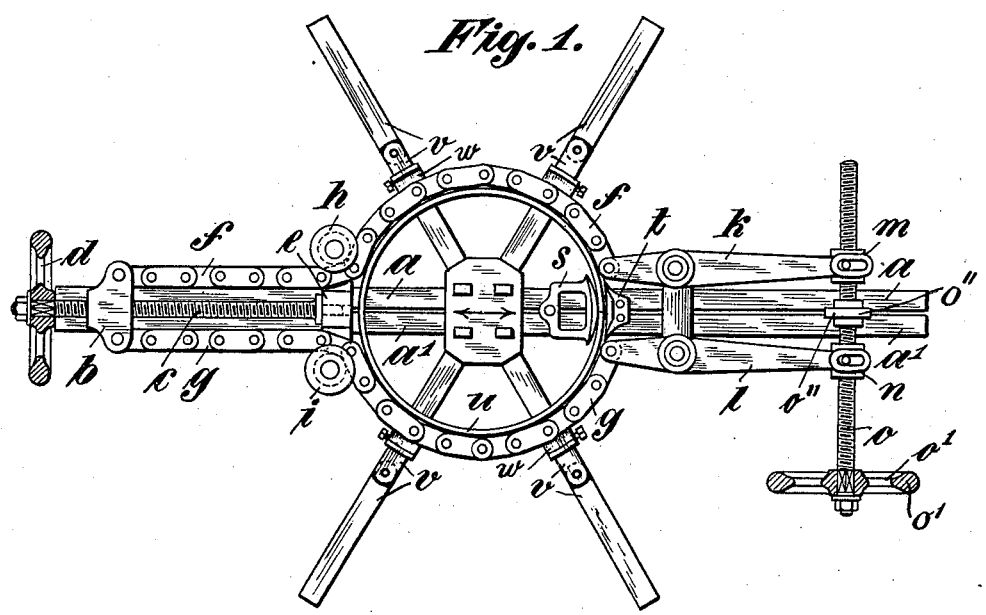
Figure 2:
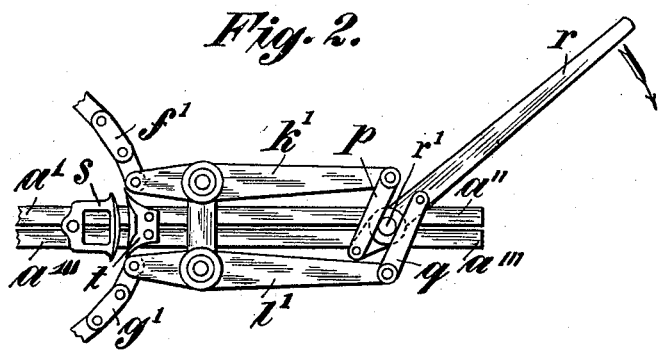

Figure 1 is a plan-view of the apparatus, with some parts shown in section. Fig. 2 is a plan-view of a modification of the mechanism for pulling the chains.

Referring in the first place to Fig. 1, $a$ and $a^1$ are two parallel bars or rails forming a track, to which is fixed an upright frame or bearing $b$. The latter has a screw-threaded eye, in which works a screw $c$, with a hand-wheel $d$ fixed to one end and with its other end rotatably engaging a rider $e$ slidable on the track. Two chains $f$ and $g$ are attached to the bearing $b$, and the rider $e$ carries two rollers $h$ and $i$ between which the chains pass, the rollers being grooved to serve as guides for the chains. The latter are attached to the shorter arms of two levers $k$ and $l$, the longer arms of which are engaged with nuts $m$ and $n$ mounted on a screw $o$. The screw $o$ has a hand-wheel $o^1$ fixed to it at one end, and is rotatable, but not axially movable, in an eye $o^{11}$ fixed to the track. The thread of the screw $o$ is right-handed on one side of the eye, and left-handed on the other side, and the nuts $m$ and $n$ are at opposite sides of the eye, so that by rotating the screw the longer lever-arms are moved toward, or away from, each other, according to the direction of rotation. Two abutments $s$ and $t$, having respectively a convex and a concave face, are adjustably fixed to the track. A support carried by the track has four arms $v$ for supporting the tire $u$ and those parts of the chain which are laid around the circumference of the tire.

The manner of using the apparatus is as follows:—The shorter arms of the levers $k$ and $l$ are moved apart, and the abutments $s$ and $t$, and rider $e$, are adjusted relatively to each other on the track so that the tire can be laid on the supporting arms $v$ between the chains and between the rider and the abutment $t$, the convex face of the abutment $s$ being pressed against the inner circumference of the tire at the joint where the ends of the band meet. The joint having been raised to welding heat before the tire is placed in position or afterward for example by an electrical heating appliance, the screws $c$ and $o$ are then rotated so that the tire is strongly but evenly compressed, and the joint of the ring is cleanly welded. If the width of the chains is smaller than that of the tire, longitudinally adjustable rests $w$ for the chains are preferably provided on the supporting arms $v$, so that the chains bear against the central part of the tire-band.

In the modification shown in Fig. 2 the levers $k^1$ and $l^1$, to which the chains $f^1$ and $g^1$ are attached, are actuated by means of a hand-lever $r$, pivoted at $r^1$ to the track $a^{11}$, $a^{111}$. The lever $r$ is connected to the levers $k^1$ and $l^1$ by links $p$ and $q$ respectively, the connection being such that by moving the lever $r$ as indicated in the drawing by the arrow the ends of the chains are drawn together by the shorter arms of the levers $k^1$ and $l^1$.

What I claim as my invention and desire to secure by Letters Patent of the United States is:—

1. In means for welding tires and similar annular bodies, the combination of two chains, means for adjustably fixing one end of each chain, means for drawing together the other ends of said chains, and a pair of guides between which the ends of the tire or body to be welded are adapted to be placed.

2. In means for welding tires and similar annular bodies the combination of two chains, means for adjustably fixing one end of each chain comprising a rider movable upon said chains, means for drawing together the other ends of said chains, and a pair of guides between which the ends of the tire or body to be welded are adapted to be placed.

3. In means for welding tires and similar annular bodies the combination of two chains, means for adjustably fixing one end of each chain comprising a rider movable upon said chains, a bearing and a screw threaded into said bearing and engaging said rider, means for drawing together the other ends of said chains, and a pair of guides between which the ends of the tire or body to be welded are adapted to be placed.

4. In means for welding tires and similar annular bodies the combination of two rails, a tire support comprising arms carried by said rails, a frame on said rails, a rider movable on said rails between the frame and the tire support, a pair of chains attached to said frame at one end and means for drawing together the other ends of said chains.

In witness whereof I have signed this specification in the presence of two witnesses.

HEINRICH SIEGMANN.

Witnesses:
P. v. Bülow,
Robert J. Thompson.

---

Copies of this patent may be obtained for five cents each, by addressing the "Commissioner of Patents, Washington, D. C."